Aug. 9, 1960  L. A. LEIFER  2,948,542
TWO-JAW INDEXING CHUCK
Filed May 29, 1958  6 Sheets-Sheet 1

INVENTOR.
LORENZ ALBERT LEIFER
BY
Andrus & Starke
Attorneys

Aug. 9, 1960    L. A. LEIFER    2,948,542
TWO-JAW INDEXING CHUCK
Filed May 29, 1958    6 Sheets-Sheet 2
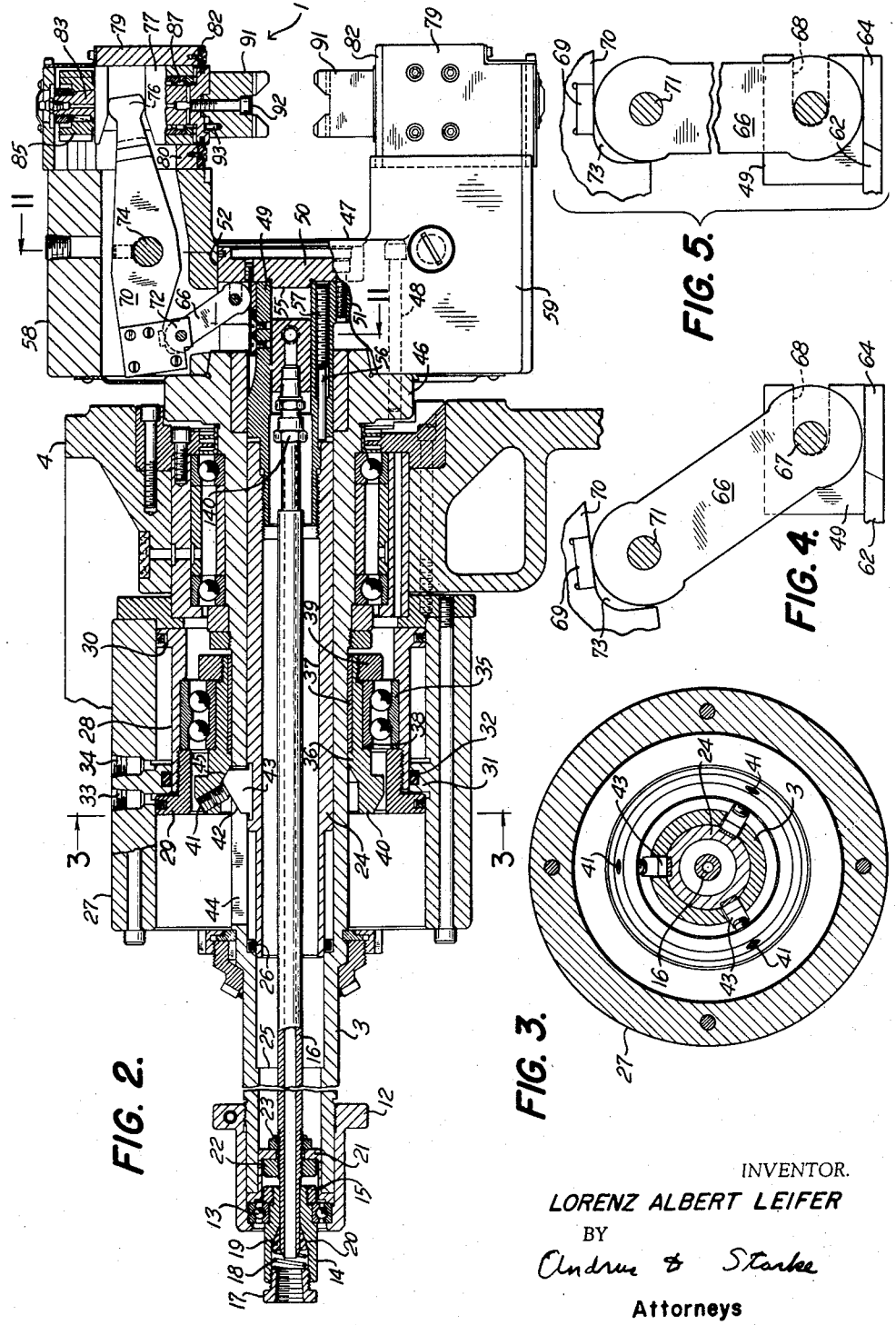
INVENTOR.
LORENZ ALBERT LEIFER
BY
Andrus & Starke
Attorneys Aug. 9, 1960 L. A. LEIFER 2,948,542
TWO-JAW INDEXING CHUCK
Filed May 29, 1958 6 Sheets-Sheet 3

INVENTOR.
LORENZ ALBERT LEIFER
BY
Andrus & Starke
Attorneys

Aug. 9, 1960 L. A. LEIFER 2,948,542
TWO-JAW INDEXING CHUCK
Filed May 29, 1958 6 Sheets-Sheet 5

INVENTOR.
LORENZ ALBERT LEIFER
BY
Andrus & Starke
Attorney

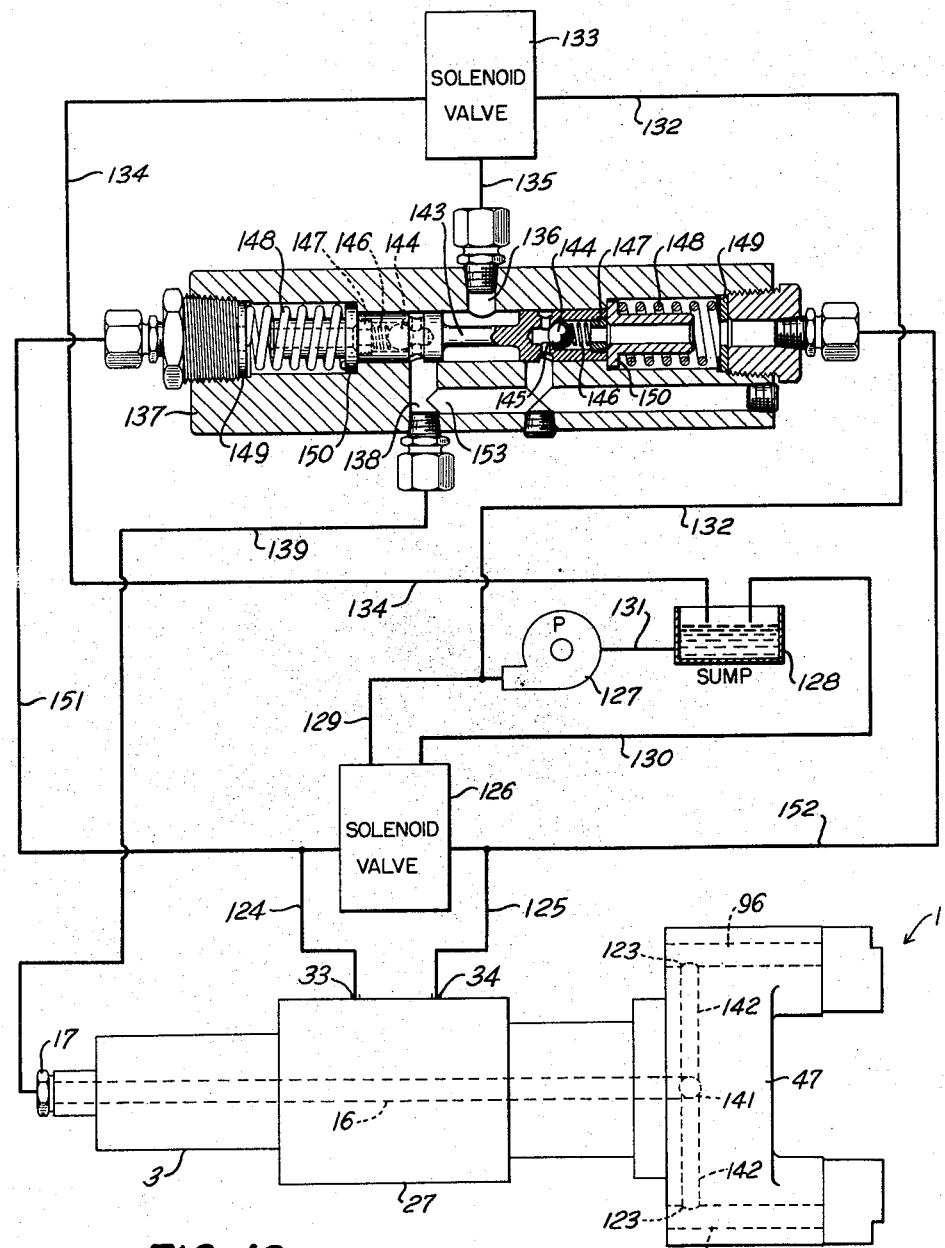

United States Patent Office 2,948,542
Patented Aug. 9, 1960

2,948,542
TWO-JAW INDEXING CHUCK

Lorenz Albert Leifer, Madison, Wis., assignor to Gisholt Machine Company, Madison, Wis., a corporation of Wisconsin Filed May 29, 1958, Ser. No. 738,780

7 Claims. (Cl. 279—5)

This invention relates to a two-jaw indexing chuck, and more particularly to an indexing chuck adapted for use in the machining of fittings and the like which have a plurality of openings therein.

Chucks of the general type contemplated are usually secured for rotation with the forward end of a machine tool spindle and include a pair of opposed indexable jaw members for clamping the workpiece in alignment with a tool for boring, threading and the like.

The present invention is directed to a novel jaw indexing mechanism, and provides a compact, efficient chuck which is superior in many respects to previous mechanisms The accompanying drawings illustrate the best mode presently contemplated by the inventor for carrying out the invention.

In the drawings:

Fig. 2 is a longitudinal axial vertical section of the apparatus with some parts in full elevation;

Fig. 3 is a transverse section taken on line 3—3 of Fig. 2;

Fig. 4 is an enlarged side elevation of the actuating link in the retracted position;

Fig. 5 is a view similar to Fig. 4 with the link in the chucking or closed position;

Fig. 12 is a schematic view of the hydraulic actuating system with the interlock valve shown in enlarged section.

Figure 1:
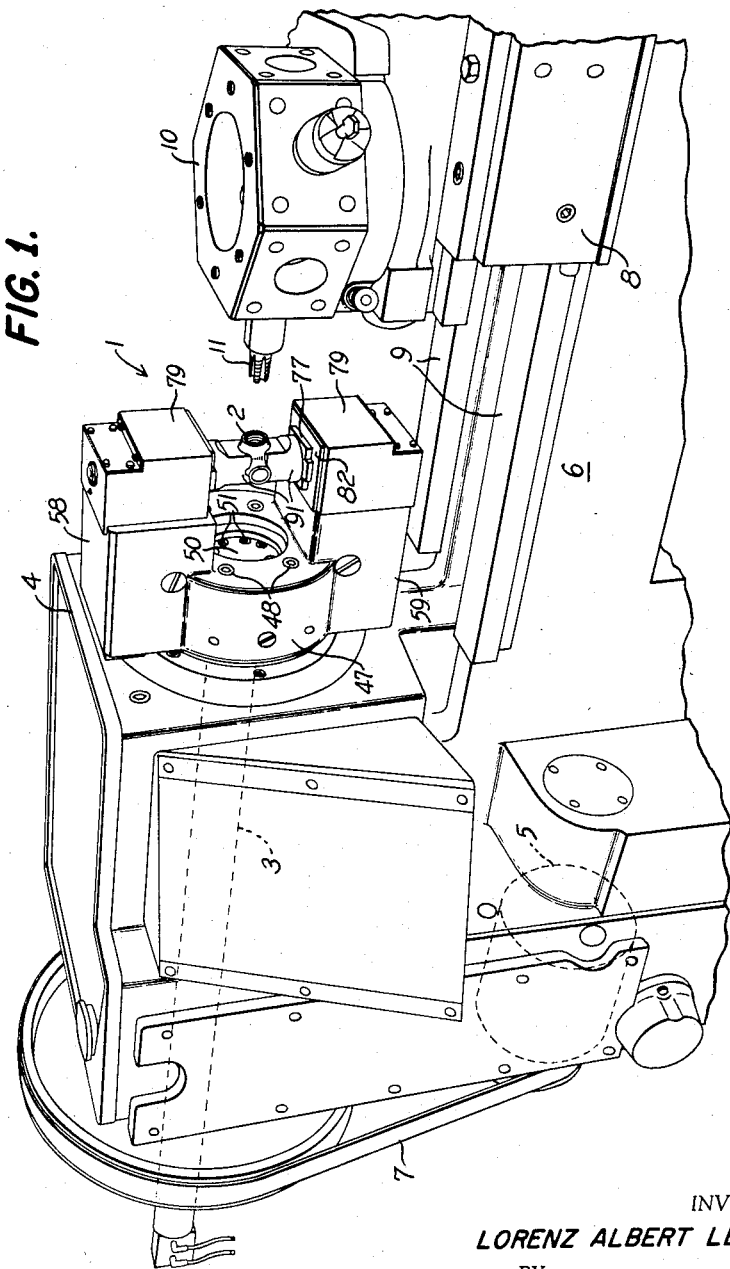
Figure 1 is a perspective view of a machine tool to which the chuck of the invention is attached.

As shown in the drawings, the apparatus of the invention generally comprises an indexing chuck 1 adapted to securely hold a suitable workpiece 2 for rotation with a spindle 3 mounted within the headstock 4 of a machine tool. The rotary drive connection to spindle 3 is shown schematically and comprises a suitable motor 5 mounted within the bed 6 of the machine and connected by a belt 7 or the like to the spindle. A carriage 8 is slideably mounted on ways 9 on bed 6 and carries a suitable tool holder 10, that shown being of the indexible turret type, for a tool 11.

As best shown in Fig. 2, the rearward end of spindle 3 extends outwardly of headstock 4 and threadably receives a cap member 12 thereon. An annular bearing 13 is secured within cap 12 and receives the inner end portion of a distributor tube 14 which is tightened thereon by a nut 15. Tube 14 extends outwardly from cap 12 and receives the rear end portion of a longitudinally extending oil supply tube 16 disposed within spindle 3.

A bushing 17 is received within the end of tube 14 and is adapted to receive a hose coupling for supply of oil to tube 16, to be described more fully hereinafter. Bushing 17 provides a seat for a spring 18 which is biased against a tapered annular seal or bushing 19 of polytetrafluoroethylene, sold under the trade name Teflon, or other similar material having an extremely low coefficient of friction. Bushing 19 is disposed between the body of oil tube 16 and a tapered inner surface portion 20 of distributor tube 14. Since the taper of seal 19 and surface 20 reduces in a forward direction, the compression of spring 18 and the pressure of any oil entering tube 14 will tend to tighten the seal.

The inner diameter of cap 12 increases inwardly of bearing 13 to approximately the outside diameter of spindle 3, whereby the annular flanged end of a cup-shaped collar 21 is received between the end of the spindle and bearing 13. Collar 21 is provided with an opening through which oil tube 16 passes, and is tightened against bearing 13 by a suitable collar 22 and stop nut 23 threaded on tube 16.

The above construction permits rotation of spindle 3 relative to an oil hose connection at bushing 17, the latter and oil tube 16 remaining stationary.

*Chucking mechanism*

Workpiece clamping is effected by a longitudinally extending annular draw sleeve 24 mounted concentrically for sliding movement within spindle 3. The outside diameter of the rear end portion of sleeve 24 is reduced and engages a complementary surface of spindle 3 centrally of the latter. An annular shoulder 25 is provided within the spindle to limit the rearward movement of draw sleeve 24, and an annular oil seal 26 is disposed forwardly of the shoulder.

Sliding actuation of draw sleeve 24 is effected by hydraulic mechanism including a cylinder 27 which concentrically surrounds the central portion of spindle 3 and is suitably anchored within headstock 4. An annular piston 28 is mounted for hydraulic sliding actuation within cylinder 27, with the piston having annular heads 29 and 30 at the left and right ends thereof, respectively. The central portion of piston 28 rides on an annular flange 31 within the cylinder, flange 31 containing a suitable O-ring seal 32. During sliding movement of piston 28, flange 31 provides a stop engaged by the respective head 29 or 30.

Fluid is supplied for leftward movement of piston 28 through a port 33 connected between flange 31 and head 29. Similarly, fluid is supplied for rightward movement through a port 34 connected between flange 31 and head 30. The hydraulic connections to ports 33 and 34, and the associated hydraulic system will be described hereinafter.

Suitable connection between piston 28 and draw sleeve 24 is made through an annular bearing member 35 disposed within the piston and mounted for axial movement therewith. The inner annular face of member 35 is disposed in engagement with the forward end portion of an annular bearing ring 36 mounted with a suitable bushing 37 for rotation with spindle 3. Bearing member 35 is tightened against a shoulder 38 of ring 36 by a forwardly disposed collar 39 threadably mounted on the latter.

Ring 36 extends rearwardly from shoulder 38 and is provided with an annular flange 40 which threadably receives a plurality of circumferentially spaced suitable set-screws 41 therein, the latter being disposed at an acute angle to the spindle axis and adapted to be screwed downwardly in a forward direction.

The lower face of each set screw 41 is adapted to engage a tapered upper surface 42 of a separate thrust block 43, each of which passes through a separate longitudinal slot 44 in spindle 3 and is seated in an inset portion of the outer surface of draw sleeve 24, slightly forwardly of the reduced rear end portion of the sleeve.

Rightward movement of piston 28 will thus transmit the necessary force through set screws 41 and thrust blocks 43 to slide draw sleeve 24 forward.

Blocks 43 are each provided with a second tapered surface 45, disposed forwardly of surface 42, surface 45 being engageable by a complementary surface of bearing ring 36 whereby the latter forces blocks 43 and draw sleeve 24 rearwardly when piston 28 moves to the left.

Slots 44 permit longitudinal movement of thrust blocks 43 without interfering with spindle 3.

Bearing member 35 permits rotation of the draw sleeve actuating assembly with spindle 3, and allows cylinder 27 and piston 28 to remain fixed against rotation.

The forward end of spindle 3 extends outwardly from the front face of headstock housing 4, and is flanged radially outwardly at 46. The central circular rearward portion 47 of the chuck housing is secured to the face of flange 46 by bolts 48, and thereby rotates with spindle 3.

The front end portion of sleeve 24 terminates slightly rearwardly of spindle flange 46 and threadably receives the inner reduced end of an annular adapter 49. Adapter 49 extends beyond flange 46 and terminates in a cap 50 of enlarged radius which is secured to the end of the adapter as by bolts 51. The contour of the chuck housing provides a bearing surface for the circumferential edge 52 of cap 50 and permits longitudinal sliding motion of the cap relative thereto.

To prevent dirt, cuttings and other foreign matter from penetrating behind the exposed face of cap 52, a spring loaded annular seal is disposed in a groove in edge 52 and bears against portion 47 at all times. The seal comprises an inner crimped ring 53 of Phosphor bronze or other suitable spring steel, surrounded concentrically by a pair of flat split rings 54 of Teflon or the like to provide a continuous surface.

It is highly desirable to position the inner face 55 of cap 50 relative to the remainder of the chuck mechanism and the machine as a whole. This is accomplished by the threaded mounting of adapter 49 within draw sleeve 24, together with a pin 56 disposed longitudinally in the wall of the adapter and selectively locked against the end of draw sleeve 24 by a set-screw 57.

Figure 6:
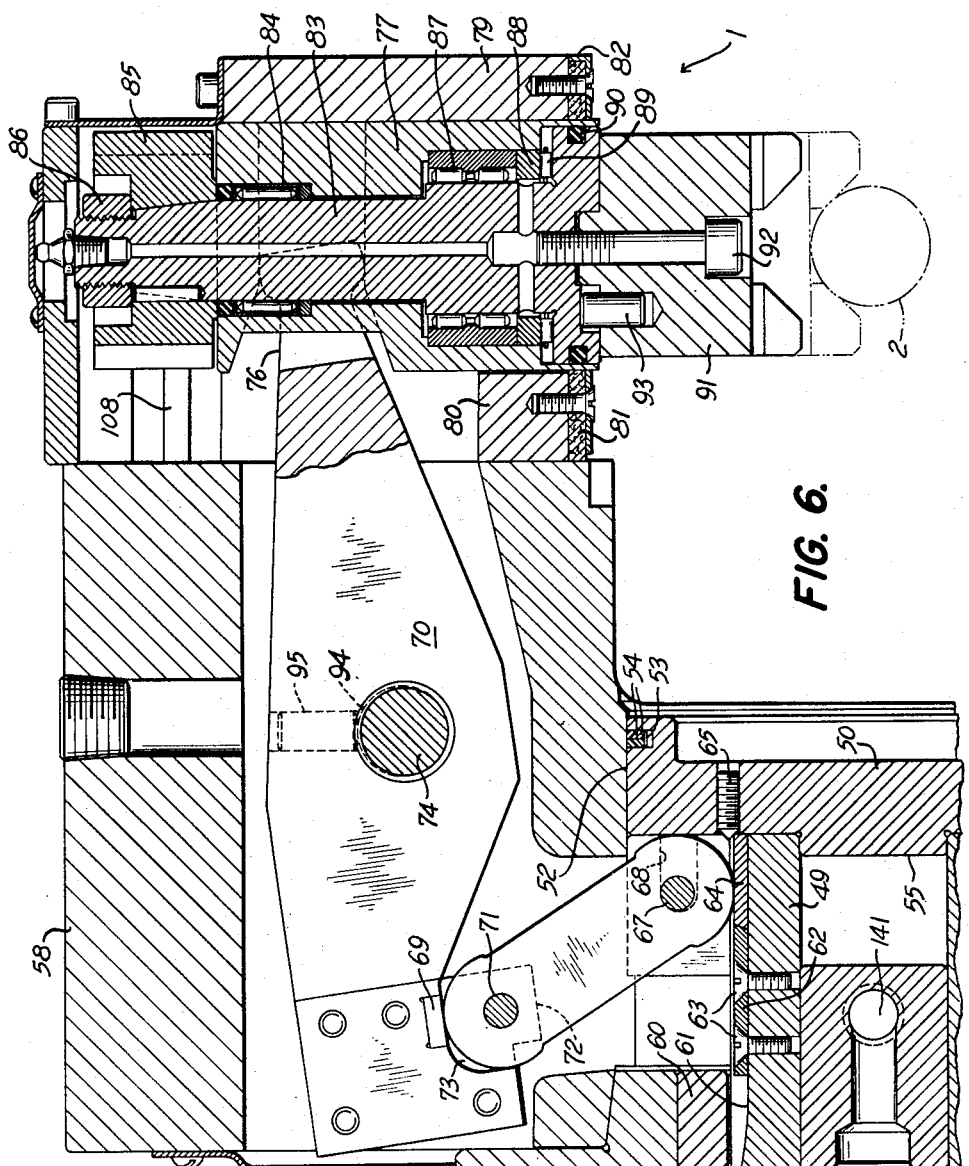
Fig. 6 is an enlarged vertical section of the upper half of the chuck head with some parts in full elevation.
Figure 7:
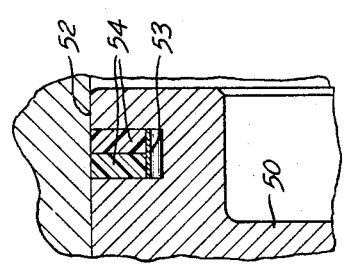
Fig. 7 is an enlarged vertical section of the spring-loaded seal for the adaptor cap.
Figure 8:
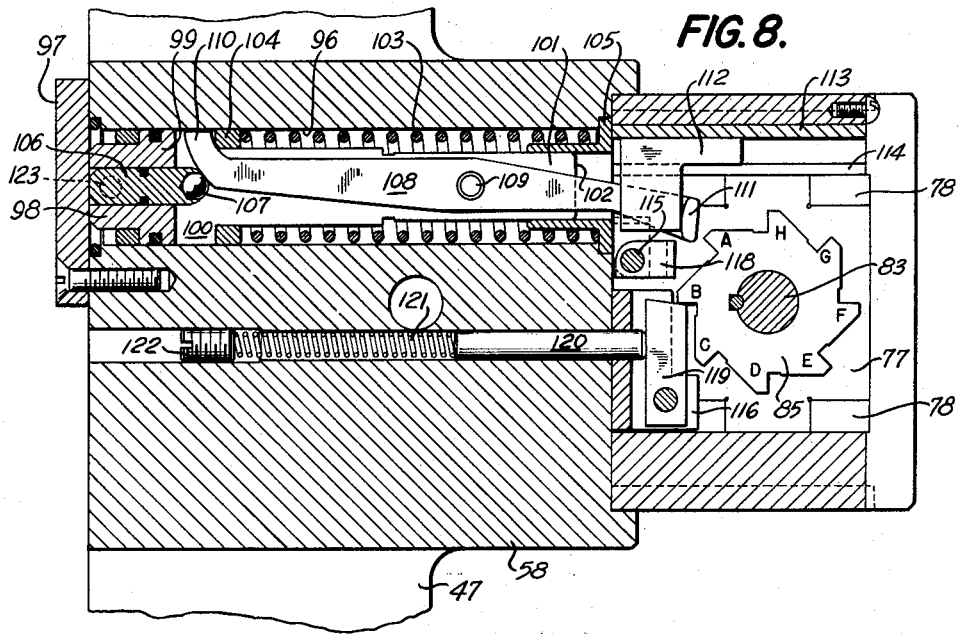
Fig. 8 is a horizontal section of the upper half of the chuck head showing the indexing mechanism in its retracted position.

Workpiece clamping is accomplished by a pair of identical mechanisms actuated by longitudinal movement of adapter 49, each mechanism being disposed in its respective upper or lower rectangular portion 58 or 59, respectively, of the chuck housing. Consequently, only the upper assembly within housing portion 58 will be described. This assembly is best illustrated in Figs. 2, 6 and 8 of the drawings.

Adapter 49 is encircled by a bushing 60 mounted within spindle 3 and is provided with a longitudinally extending slot or groove 61 along the top surface thereof. The left end of groove 61 receives a clamp plate 62 secured thereto by screws 63, with the right end of the plate having a slight overhang to clampingly receive a flat wear plate 64 of tungsten carbide or the like. Wear plate 64 is held against the clamping edge of plate 62 by a set-screw 65 threaded in cap 50, and provides the bearing surface for the rounded lower end portion of a hardened steel link member 66.

A link pin 67 extends through the lower end portion of link 66 and is disposed in a longitudinal slot 68 in cap 50, for purposes to be described.

Link 66 extends upwardly from wear plate 64 and terminates in a rounded end portion similar to that on the lower end and which is adapted to bear on a wear plate 69, similar to plate 64, which is secured in an insert in the rear end lower edge portion of an axially extending jaw lever 70. Link 66 is secured for engagement with wear plate 69 at all times by a horizontal pin 71 which passes through the upper end portion of the link and which is journalled in a pair of vertical plates 72 which extend downwardly from the rear end of jaw lever 70 to form a clevis arrangement.

The axes of pins 67 and 71 are substantially disposed on the center of curvature of the curved ends of link 66, thus providing a constant distance from the pin axes to the respective wear plates.

As can best to see in Figs. 4 and 5, the lower edge of lever 70 curves rearwardly from wear plate 69 on a radius of curvature smaller than the radius of the curved end of link 66, thus providing an arcuate space 73 between the link and lever. The apparatus is designed so that the heavy radial loads are passed from link 66 to the wear plate, and at 90° thereto, with only very light side loads incident on the lever.

Lever 70 extends forwardly from link 66 within housing 58 and is centrally mounted for vertical pivotal movement on a transversely extending rotatable pivot shaft 74, the ends of which are mounted in bushings 75 in the vertical side walls of the housing. The forward end of lever 70 is provided with a forked member 76 which is disposed in substantially mating engagement with the upper portion of a rectangular vertically extending jaw base 77.

The vertical faces of jaw base 77 are disposed for sliding movement in suitable guide members 78 secured within a three-sided vertical guide housing 79, the open side of the latter being secured to housing 58. A wiper block 80 extends between the open ends of housing 79, as shown in Fig. 6, and is mounted to housing 58. To prevent penetration of foreign matter into the chuck, a wiper 81 of felt or other suitable resilient material is clamped to the lower faces of housing 79 and block 80 by a rectangular clamp ring 82 and engages the full perimeter of base 77 whereby any accumulation of foreign matter on the exposed surface of the jaw base is wiped off during the unchuckiing operations.

Jaw base 77 is provided with an axial bore and receives therewithin an annular jaw spindle 83. A suitable anti-friction bearing 84 is mounted between base 77 and spindle 83 adjacent the upper end of base 77 to permit rotation of spindle 83 relative to base 77. The upper end of spindle 83 extends above base 77 and tapers inwardly to receive a ratchet wheel 85 which is similarly tapered and tightened to spindle 83 by a nut 86. Operation of ratchet wheel 85 will be described hereinafter.

The diameter of spindle 83 increases in a stepped manner adjacent the lower end thereof with the upper step surface being engaged by a suitable radial needle bearing 87 fixedly mounted in the wall of jaw base 77. An annular thrust washer 88 is secured between the lower surface of bearing 87 and the upper surface of a flat needle thrust bearing member 89 seated on the upper face of the shoulder formed by the lower stepped portion. Thrust bearing 89 is designed to prevent uneven loading of the workpiece in the chuck, as will be described.

The circumferential edge of the enlarged lower end of spindle 83 is complemented by the thin-walled lower end portion of jaw base 77, with an O-ring 90 being provided in the spindle to seal the joint.

A workpiece clamping jaw 91 is fixedly secured to the lower end face of spindle 83 by a bolt 92 which is threadably received in aligned axial openings in the jaw and spindle. Rotation of jaw 91 relative to spindle 83 is prevented by a suitable pin 93 passing therebetween, pin 93 also serving to accurately locate jaw 91 relative to spindle 83.

Chucking mechanism operation

Fig. 2 shows the mechanism when the two identical jaws 91 are in unchucked position, fluid pressure is on port 34 and port 33 is connected to drain, whereby piston 28, draw sleeve 24, adapter 49, and cap 50 are at the right. Link 66 is disposed with its inner curved end engaging wear plate 64 and touching cap 50, and extends upwardly in a rearward direction for engagement with the rear portion of lever 70 at wear plate 69. The forked member 76 is in its uppermost position whereby jaw base 77 and spindle 83 are held at the top of their stroke.

When it is desired to chuck a workpiece 2, port 34 is connected to drain and port 33 connected to fluid pressure, thereby causing piston 28 to retract to the left. Tapered surfaces 45 of thrust blocks 43 are engaged by the complimentary surface of bearing ring 36 to move the blocks and thus draw the jaw actuating sleeve 24 leftwardly. The laterally extending inner face of cap 50 now thrusts back against the inner end of link 66, and this thrust is transmitted to the outer end of the link and to jaw lever 70 which pivots laterally on shaft 74, whereby forked member 76 thrusts jaw base 77 and its associated spindle 83 and jaw 91 laterally into chucked position. During this movement, lower pin 67 leaves the end seat of slot 68 and is thereby relieved of any load, the full load being borne by link 66. Wear plate 64 takes the full thrust, which is radial.

The identical operation is selectively performed simultaneously by the similar mechanism in lower housing 59.

During the first part of drawback travel of draw sleeve 24, jaws 91 advance quickly toward workpiece 2, since the top of links 66 move radially outward relatively fast at the beginning of the chucking stroke. At this time, the average ratio of piston-to-jaw travel is about 1 to 2. However, as jaws 91 approach the chucking position the toggle action of links 66 becomes increasingly effective since they approach a vertical position with less radial movement, the ratio of piston-to-jaw travel during actual chucking engagement with workpiece 2 averaging about 4 to 1. The chuck shown provides a jaw stroke of about 7/16 inch.

In view of the toggling action, the primary forces applied to links 66 by draw sleeve 24 at the instant of chucking are radial. Hence, the use of wear plates 64 and 69, the surfaces of which are primarily disposed radially from and substantially parallel to the draw sleeve axis and which provide the lowest possible co-efficient of friction. The contacting surfaces are hardened steel against tungsten carbide. Furthermore, the radial loads between the upper and lower links 66 are equally balanced, resulting in low side loads on and thus low frictional resistance to the movement of draw sleeve 24. The result is that a nominal draw bar pull from piston 28 is converted to large chucking forces with very little loss. A workpiece 2 may therefore be held securely, even with centrifugal forces at spindle speeds of 2400 r.p.m. Previous constructions have been found to chuck securely at speeds only up to about 1200 r.p.m.

It is inevitable that castings, and other workpieces of the type machineable with a chuck of the general type of the invention, vary slightly in outer dimensions from piece to piece. They may not be uniform and thus, when chucked, may tend to cause bending of the jaws due to side forces, similar to rocking of a table on an uneven floor. Previous chuck mechanisms were not designed to prevent such bending, thus presenting workpiece alignment problems with a resultant loss of accuracy. The present invention eliminates the bending problem by utilizing needle thrust bearings 87 which can withstand the bending moments whereas ball bearings could not. Any side thrust on the jaw will be translated into vertical axial thrust on the respective jaw bases and spindles.

In addition, it is important for machining accuracy that the upper and lower jaw bases 77 remain on the same lateral axis at all times. Previous construction, which utilized a ratio of axial jaw bore length to jaw bore width (or diameter) of approximately 1 to 1, provided a relatively large offset from the axis with a given side load. The present construction utilizes a length-to-width ratio of about 3½ to 1, which substantially reduces the amount of offset from the axis with the same side load. This ratio is considered to be the minimum for a satisfactory solution of the problem.

Since both jaws 91 must be adjusted to be equidistant from the spindle axis at any given position of draw sleeve 24, each pivot shaft 74 is provided with an eccentric step 94 where it passes through the lever, and a set-screw 95 for tightening the lever to the shaft. Jaws 91 are adjusted to center by loosen-set-screws 95, turning shafts 74 in bushings 75 until the eccentrics 94 shift the levers accordingly, and then re-locking screws 95.

Upon retraction of draw sleeve 24 for unchucking, the seat ends of slots 68 thrust pins 67 forwardly to return links 66 and levers 70 to their initial unchucked position.

Indexing mechanism

Figure 11:
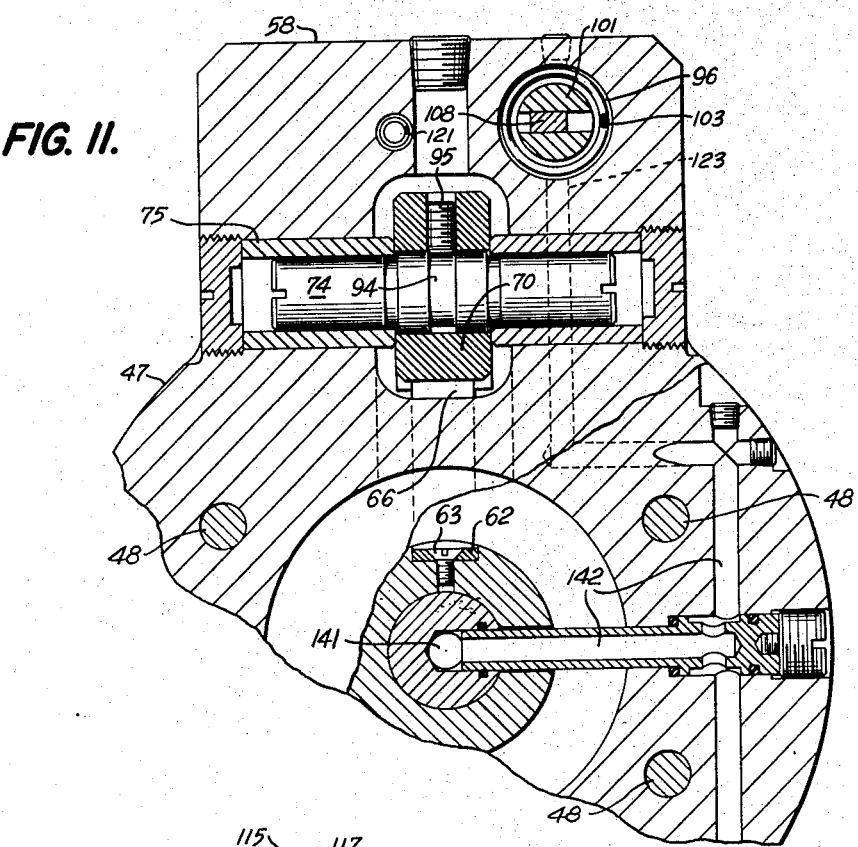
Fig. 11 is a transverse vertical section taken on line 11—11 of Fig. 2.

As best shown in Figs. 8 and 11, the upper portion of housing 58 provides an axially extending horizontal cylinder 96 disposed in a horizontal plane containing ratchet wheel 85. The cylinder is closed by a cap plate 97 and contains an elongated piston 98 having a thickened head portion 99 of similar diameter as cylinder 96. Head portion 99 joins with a split portion 100 of the same diameter which merges finally into a longitudinally split portion 101 of reduced diameter having an end face or shoulder 102. Piston 98 is spring-biased away from ratchet wheel 85 by a coil spring 103 secured between a collar 104 on portion 100 and a piston bushing 105 fixed at the forward end of cylinder 96.

An axially disposed plunger 106 is mounted for sliding movement within piston head 99 with the rearward end thereof normally engaging cap plate 97. The forward end of plunger 106 extends from head 99 into portion 100 and provides a suitable socket for a bearing such as a contact ball 107. Plunger 106 and its associated ball 107 are adapted to selectively pivot an elongated index lever 108 centrally mounted for horizontal pivoting on a shaft 109 suitably journalled in the piston walls.

Lever 108 extends rearwardly within split portion 100 and terminates in a laterally offset projection 110 having an arcuate rear cam surface engageable by ball 107. The forward portion of lever 108 extends beyond piston 98 and housing 58 into the cavity formed by guide housing 79 and closely adjacent ratchet wheel 85, terminating in a flange-like index finger 111. The positioning of lever 108 relative to wheel 85 is such that the former closely approaches being on a tangent of the latter.

Figure 10:
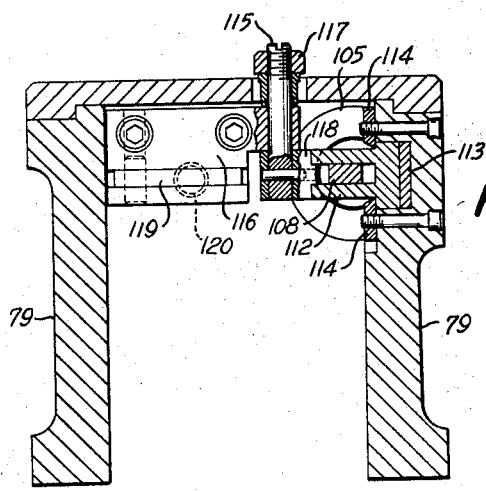
Fig. 10 is a vertical section taken on line 10—10 of Fig. 9.

A locking block 112 is disposed for sliding movement laterally of the jaw axis on a guide plate 113 which is vertically disposed in the wall of guide housing 79. Locking block 112 is held in engagement with guide 113 by a pair of suitable gibs 114, and has a bifurcated inwardly extending portion through which the front portion of lever 108 passes, as best shown in Fig. 10. Guide plate 110 is of hard steel and is accurately machined to provide constant thickness for purposes to be described.

Figure 9:
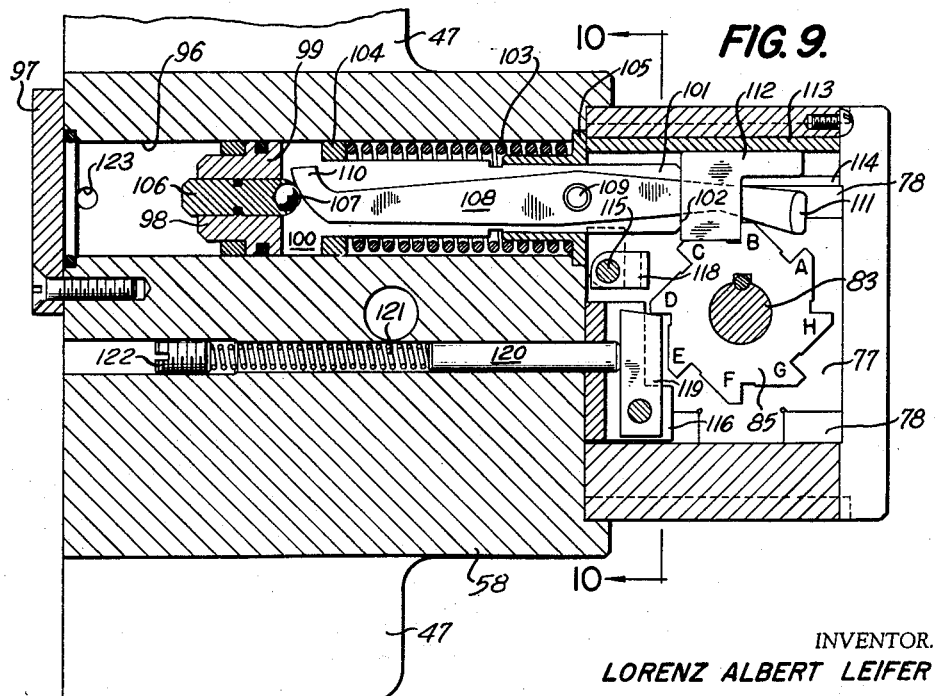
Fig. 9 is a view similar to Fig. 8 with the mechanism in indexed position.

A pin 115 is vertically mounted for rotation in a suitable bearing in a dog block 116 mounted on housing 58. Pin 115 has a locking nut 117 threaded on its upper end and extends downwardly to adjacent ratchet wheel 85. An index dog 118 is secured to pin 115 and is disposed in a horizontal plane with lever 108. Dog 118 is adapted to be turned from a forwardly extending position, shown in full in Figs. 8 and 9, to a lateral position, shown by dash lines, by turning pin 115, as will be described.

In addition, a laterally extending locking dog 119 is pivotally secured at its outer end to dog block 116 and extends inwardly therefrom to closely adjacent ratchet wheel 85. The inner end of dog 119 is tapered, and the dog is pressed forwardly by a pin 120 slideably mounted in housing 58 and biased by a spring 121 held by an adjustment screw 122.

*Indexing operation*

Assume that the apparatus is in the position shown in Fig. 8, with piston 98 at the left, lever 108 disposed with projection 110 farthest from the cylinder axis, and with index dog 118 disposed longitudinally.

For purposes of clarity, the various teeth on ratchet wheel 85 have been lettered consecutively from A through H in a counterclockwise direction.

To index the wheel 85, and thus spindle 83 and jaw 91, fluid under pressure is provided from a source, to be described, to a port 123 at the left of piston 98, pushing the latter against spring 103. When the fluid pressure exceeds the spring pressure, piston 98 will move to the right, carrying with it lever 108. Locking block 112 will remain in its left-most position.

As index finger 111 moves to the right, it will engage tooth A of ratchet wheel 85 and rotate the latter clockwise. At the same time, tooth C will push locking dog 119 against pin 120 and out of the way. Finger 111 will ride up on tooth A, causing lever 108 to pivot whereby projection 110 rides down on ball 107 to push plunger 106 rearwardly. Since block 112 is in the path of movement of piston 98, further movement of the latter will bring shoulder 102 into engagement with locking block 112 to push the block forward into engagement with the next adjacent tooth B. Finger 111 will now ride over tooth A, but locking block 112 will continue to push tooth B to index jaw 91 until the corner of the block coincides with the corner formed by the tooth. At this point, block 112 will have become wedged between a flank of the tooth and the accurately machined face of guide plate 113, and ratchet wheel 85 can not index clockwise any farther. In addition, wheel 85 can not turn counterclockwise because locking block 112 is held against the lateral face of tooth B with a thrust on lever 108 from plunger 106 in excess of any forces created against the jaws by cutting loads on the workpiece. Thus the jaws are held in indexed position in response to the fluid pressure supplied.

Further locking of wheel 85 against counterclockwise movement is provided by the tapered end of locking dog 119 which has sprung back and now engages the face of tooth D.

The thickness and top surface tolerances of guide plate 113 are accurately controlled during manufacture whereby block 112 will be tightly wedged against the plate by the radial thrust of the long edge of the ratchet tooth, with no tendency to slip.

Since both upper and lower jaws 91 will be indexed in the same manner simultaneously, workpiece 2 will be indexed and now ready for machining operations.

The index described above provides a two-tooth or 90° rotation of the ratchet. If only a one-tooth or 45° index is desired, pin 115 is turned to dispose index dog 118 laterally. In this situation, dog 118 will hold the forward end of lever 108 upwardly during the indexing stroke whereby finger 111 will pass over tooth A as pickup tooth H for a short distance of travel. When locking block 112 is picked up by shoulder 102, the block will engage tooth A instead of tooth B, to provide only a 45° index. Locking dog 119 will engage tooth C instead of tooth D.

To retract the jaw indexing mechanism, port 123 is connected to drain, allowing spring 103 to return piston 98 to the left. Since there now is no pressure on the rear end of plunger 106, finger 111 will freely ride over the respective ratchet tooth. There will be no sticking of finger 111 on the tooth; nor will centrifugal force of the rotating chuck have any effect on the ability of the finger to ride over the tooth, as was the case in prior constructions.

As piston 98 reaches the end of its return stroke, the rear end portion of plunger 106 will engage cylinder cap 97, causing the plunger to move to the right. The offset cam surface of projection 110 will ride up on ball 107, thus pivoting lever 108 back to its initial position.

*Hydraulic system*

The hydraulic system for jaw indexing and chucking is shown schematically in Fig. 12, and includes a safety device to relieve pressure on ratchet wheel 85 during chucking and unchucking.

Chucking port 33 and unchucking port 34 are connected through respective oil lines 124 and 125 to a solenoid operated reversing valve 126 of any suitable type, the latter being connected to a pump 127 and sump 128 by lines 129 and 130 respectively.

Pump 127 is supplied with fluid through a line 131 line 132 to a suitable solenoid valve 133, the latter being from sump 128, and also supplies pressure fluid through a line 132 to a suitable solenoid valve 133, the latter being connected to sump 128 by a line 134. Valve 133 is controllable, as will be described, to provide pressure fluid through a line 135 to a port 136 in an interlock valve 137. Under certain conditions, fluid entering port 136 will pass through valve 137 to a port 138 and leave through a line 139 to bushing 17 on the end of oil tube 16.

The forward end of oil tube 16 is provided with a rotary coupling 140 which communicates with an elbow passageway 141 axially disposed within adapter 49 and rotatable therewith. Passageway 141 communicates through a lateral passageway 142 in the central portion 47 of the chuck housing and into upper housing 58 for connection with port 123 of cylinder 96.

Interlock valve 137 has an axial passage extending therethrough with a spool 143 disposed for sliding movement centrally of the passage. Each end portion of spool 143 has a partially threaded axial opening therein to receive balls 144. The balls are biased inwardly and seated against axial openings 145 in the spool by springs 146 held in place by suitable retaining plugs 147. Openings 145 have lateral extensions which communicate with a small space adjacent the valve walls.

When no pressure, or pressure below 150 p.s.i., is in the system, spool 143 is maintained centrally of the valve by relatively large springs 148 which are precompressed between suitable outer annular spacers 149 and inner spring seats 150.

Fluid pressure is supplied through a passageway behind left ball 144 by a hydraulic line 151 connected into unchuck line 124. In like manner, fluid pressure is supplied through a passageway behind right ball 144 by a hydraulic line 152 connected into chucking line 125.

When jaws 91 are closed, as during machining, pressure in line 125 will also exist in line 152 whereby spool 143 will be moved to its leftmost position compressing left spring 148. Under these circumstances, actuation of solenoid valve 133 will cause fluid to pass through line 135 and port 136 and around spool 143 to port 138 and hence to port 123 for indexing of the chucked jaws. Similarly, when jaws 90 are open, pressure in line 124 will also exist in line 151 whereby spool 143 will be moved to its rightmost position, compressing right spring 148. In this instance, actuation of solenoid valve 133 will cause fluid to pass through line 135 and port 136 and hence to an elbow-like passageway 153 connected to port 138. Fluid will again flow under pressure from port 138 to port 123 for indexing.

However, it is undesirable to change the chucking position of jaws 91 if full pressure is on ratchet wheel 85. Valve 137 eliminates the problem in the following manner. Assume that jaws 91 are chucked, with fluid pressure being on at port 34 and with port 33 connected to drain by reversing valve 126. The right end of interlock valve 137 will be under pressure, with spool 143 at the left and high pressure fluid being supplied through the valve from solenoid 133 to port 123. If reversing valve 126 is changed from chucked to unchucked position, line 151 will become pressurized and line 152 will be connected to drain, causing spool 143 to shift to the right under the influence of springs 148.

As spool 143 moves rightwardly, it will temporarily cut off high fluid pressure incident in line 139 from solenoid valve 133. Left ball 144 will be unseated by fluid trapped in line 139 whereby excess fluid communicates with drain line 151 and the holding pressure at port 123 will thereby be reduced. The relieved pressure removes the clamping thrust from locking block 112, but does not permit any appreciable retraction thereof.

When spool 143 reaches the central position of its rightward travel, it will remain there with fluid cut off from solenoid 133 until pressure in line 151 increases sufficiently to counteract the balancing forces of springs 148. This pressure will not reach 150 p.s.i. until the relatively free moving chucking action of jaws 91 has been completed. As the pressure in line 151 increases above this amount, the force of right spring 148 will be overcome and spool 143 will shift to its rightmost position, again opening line 139 to full pressure and applying the necessary thrust to locking block 112.

If desired, indexing and chucking operations can be made semi-automatic by controlling solenoid valves 133 and 126 from suitable limit switches, not shown, disposed at the side of the turret slides. For example, a limit switch can actuate valve 126 to retract jaws 91 during tool retraction. During slide advance, a limit switch can actuate solenoid valve 133 to provide a jaw index.

The invention provides an improved mechanism for indexing chucks which not only is more efficient than previous structures, but is based on a new concept of jaw actuation. The chuck herein disclosed is capable of use at increased spindle speeds with little or no loss of clamping power. In addition, a hydraulic safety mechanism is provided to safely permit chucking and unchucking while the jaw index pressure is on.

Various modes of carrying out the invention are contemplated as being within the scope of the following claims particularly pointing out and distinctly claiming the subject matter which is regarded as the invention.

I claim:

1. In an indexing chuck having a pair of opposed workpiece holding jaws disposed on the same axis, a chuck housing, a spindle supporting each jaw and slideable within the housing on said axis, a toothed ratchet wheel secured to each spindle to provide rotation of the latter within the housing for indexing said jaws, a pair of cylinders provided by said housing, a piston disposed for sliding movement within each said cylinder, locking means disposed adjacent each said ratchet wheel and adapted for sliding movement laterally of said axis, said locking means being disposed in the path of movement of said piston, and means to move said piston toward said ratchet wheel and into engagement with the locking means whereby the latter engages a ratchet tooth and indexes said wheel until the locking means is wedged between a lateral face of a tooth and the housing wall.

2. The apparatus of claim 1 which includes a dog biased against a tooth disposed at right angles to the tooth engaged by said locking means to provide further locking of the spindle.

3. The apparatus of claim 1 which includes a lever pivotally disposed within each said piston and merging outwardly beyond the piston into a finger portion disposed adjacent said ratchet wheel, said finger normally being disposed to engage a first tooth ahead of the tooth engaged by the locking means and with said finger riding over said first tooth as the locking means engages the next adjacent tooth.

4. The apparatus of claim 3 which includes means to prevent engagement of said first tooth by said finger during the indexing stroke of the piston whereby said locking means engages the said first tooth.

5. In an indexing chuck having a pair of opposed workpiece holding jaws disposed on the same axis, a chuck housing, a spindle supporting each jaw and slideable within the housing on said axis, a toothed ratchet wheel secured to each spindle to provide rotation of the latter within the housing for indexing said jaws, a pair of cylinders provided by said housing, a piston disposed for sliding movement within each said cylinder, a lever pivotally disposed within each said piston, the inner end portion of said lever providing an offset cam surface and the outer portion of said lever extending beyond said piston and merging into a finger portion disposed adjacent said ratchet wheel, a plunger slidably disposed in the inner end portion of each said piston and engageable with said cam surface, a locking block disposed adjacent each said ratchet wheel and adapted for sliding movement laterally of said axis, said locking block receiving said lever therethrough and being disposed in the path of movement of said piston, and means to supply fluid pressure on each said piston and plunger to move said finger and locking block into engagement with said ratchet wheel to index the same until the locking block is wedged between a lateral face of a tooth and the housing wall.

6. The construction of claim 5 in which the fluid thrust on said plunger is transmitted through said lever and to said locking block to hold the latter against said lateral face.

7. The construction of claim 5 which includes a spring normally biasing each said piston away from the respective ratchet wheel, means to relieve the pressure on said piston whereby the latter is retracted from indexed position by said spring, said finger freely riding over the ratchet wheel during the retract stroke, and means to slide said plunger into actuating engagement with said cam surface at the end of the retract stroke to pivot said lever into position for the next indexing stroke.

References Cited in the file of this patent

UNITED STATES PATENTS

| | | |
|---|---|---|
| 2,455,663 | Eaton | Dec. 7, 1948 |
| 2,480,715 | De Graff | Aug. 30, 1949 |
| 2,643,132 | Hunziker et al. | June 23, 1953 |
| 2,657,068 | Sloan | Oct. 27, 1953 |
| 2,732,216 | Sloan et al. | Jan. 24, 1956 |